United States Patent
Hori

(10) Patent No.: US 10,806,131 B2
(45) Date of Patent: Oct. 20, 2020

(54) AQUAPONICS SYSTEM, AND FISH AND SHELLFISH REARING AND PLANT CULTIVATION METHOD USING THE AQUAPONICS SYSTEM

(71) Applicant: HORIMASA CO., LTD., Tokyo (JP)

(72) Inventor: Masaharu Hori, Tokyo (JP)

(73) Assignee: HORIMASA CO., LTD., Tokyo (JP)

( * ) Notice: Subject to any disclaimer, the term of this patent is extended or adjusted under 35 U.S.C. 154(b) by 407 days.

(21) Appl. No.: 15/537,254

(22) PCT Filed: Dec. 22, 2016

(86) PCT No.: PCT/JP2016/088482
§ 371 (c)(1),
(2) Date: Jun. 16, 2017

(87) PCT Pub. No.: WO2017/138269
PCT Pub. Date: Aug. 17, 2017

(65) Prior Publication Data
US 2018/0092337 A1    Apr. 5, 2018

(30) Foreign Application Priority Data
Feb. 9, 2016    (JP) .................................. 2016-022716

(51) Int. Cl.
*A01K 63/04*    (2006.01)
*A01G 31/06*    (2006.01)

(52) U.S. Cl.
CPC .............. *A01K 63/04* (2013.01); *A01G 31/06* (2013.01); *Y02P 60/216* (2015.11); *Y02P 60/642* (2015.11)

(58) Field of Classification Search
CPC .... A01K 63/04; A01K 63/003; A01K 63/006; A01K 63/042; A01K 63/045;
(Continued)

(56) References Cited

U.S. PATENT DOCUMENTS 8,181,391 B1    5/2012  Giacomantonio
9,775,330 B1 *  10/2017 Chen .................... A01K 63/003
(Continued)

FOREIGN PATENT DOCUMENTS

CN    203399622 U    1/2014
CN    204047619 U    12/2014
(Continued)

OTHER PUBLICATIONS

Affnan's Aquaponics, Aug. 30, 2014, http://www.affnanaquaponics.com/2014/07/chop-2-revised-chop.html.
(Continued)

*Primary Examiner* — Trinh T Nguyen
(74) *Attorney, Agent, or Firm* — Oliff PLC

(57) ABSTRACT

An aquaponics system including a rearing tank of a rearing system and cultivation beds of a cultivation system, wherein the cultivation beds are arranged vertically in two or more stages. The system includes a rearing and cultivation circulating system in which liquid in the rearing tank is supplied to each of the cultivation beds, and the liquid in each bed is returned to the tank, to thereby circulate through the tank, beds, and tank. Fish and shellfish can be reared in the rearing tank and a plant can be cultivated in the cultivation beds, with the liquid circulating through the circulating path. Both a cultivation circulating system in which the liquid circulates through the water storage tank, the cultivation beds, and the water storage tank, and a rearing circulating system in which the liquid circulates through the rearing tank, the water storage tank, and the rearing tank may be arranged.

14 Claims, 5 Drawing Sheets

(58) Field of Classification Search
CPC ...... A01K 63/047; A01K 63/06; A01G 31/06; A01G 31/00; A01G 31/02; A01G 27/001; A01G 27/003; A01G 27/005; A01G 27/006; A01G 27/008; A01G 27/02; A01G 2031/006

See application file for complete search history.

(56) References Cited

U.S. PATENT DOCUMENTS

| | | |
|---|---|---|
| 2013/0047508 A1 | 2/2013 | Toone et al. |
| 2013/0098303 A1 | 4/2013 | Jones |
| 2013/0160363 A1 | 6/2013 | Whitney et al. |
| 2014/0041594 A1 | 2/2014 | Plante |
| 2014/0047767 A1 | 2/2014 | Bodlovich et al. |
| 2014/0223818 A1 | 8/2014 | Coghlan |
| 2014/0259921 A1 | 9/2014 | Smallwood et al. |
| 2014/0366443 A1* | 12/2014 | Brusatore ............... A01G 9/02 47/66.7 |
| 2015/0289459 A1 | 10/2015 | Tsai |
| 2016/0113222 A1* | 4/2016 | Hori ...................... A01K 63/04 47/59 S |
| 2017/0105393 A1* | 4/2017 | Plante ................. A01K 63/006 |
| 2018/0125018 A1* | 5/2018 | Leung .................. A01G 27/005 |
| 2019/0141964 A1* | 5/2019 | Perslow ................ A01K 63/04 |

FOREIGN PATENT DOCUMENTS

| | | |
|---|---|---|
| GB | 473279 A | 10/1937 |
| HK | 1208588 A2 | 3/2016 |
| JP | S59-098766 U | 7/1984 |
| JP | S61-131754 U | 8/1986 |
| JP | 3111953 U | 7/2005 |
| JP | 3200508 U | 10/2015 |
| JP | 6047749 B1 | 12/2016 |
| KR | 101333902 B1 | 11/2013 |
| KR | 10-2014-0023720 A | 2/2014 |
| KR | 101399512 B1 | 5/2014 |
| KR | 101479977 B1 | 1/2015 |
| TW | 201517782 A | 5/2015 |
| TW | M508905 U | 9/2015 |
| WO | 2015/045045 A1 | 4/2015 |

OTHER PUBLICATIONS

Jan. 31, 2017 Search Report issued in International Patent Application No. PCT/JP2016/088482.
Jan. 31, 2017 Written Opinion issued in International Patent Application No. PCT/JP2016/088482.
Fox et al.; "Construction of Automatic Bell Siphons for Backyard Aquaponic Systems;" College of Tropical Agriculture and Human Resources; Biotechnology; BIO-10; Jun. 2010; pp. 1-11.
Dec. 11, 2018 Office Action issued in Australian Patent Application No. 2016392368.
Feb. 4, 2019 Office Action issued in Canadian Patent Application No. 3,001,976.
Oct. 5, 2018 Search Report issued in European Patent Application No. 16867433.1.
Oct. 30, 2018 Office Action issued in Korean Patent Application No. 10-2017-7011052.
Sep. 20, 2019 Office Action issued in Chinese Patent Application No. 201680003508.4.
Apr. 16, 2020 Office Action issued in Chinese Patent Application No. 201680003508.4.
May 27, 2020 Office Action issued in Indonesian Patent Application No. P00201804078.
Feb. 7, 2018 Office Action issued in Taiwanese Patent Application No. 106100403.
Feb. 7, 2018 Search Report issued in Taiwanese Patent Application No. 106100403.
Apr. 29, 2020 Office Action issued in Taiwanese Patent Application No. 107132108.
Apr. 29, 2020 Search Report issued in Taiwanese Patent Application No. 107132108.
Nov. 27, 2019 Examination Report issued in Indian Patent Application No. 201827012473.
Nov. 26, 2019 Office Action issued in Canadian Patent Application No. 3001976.

* cited by examiner

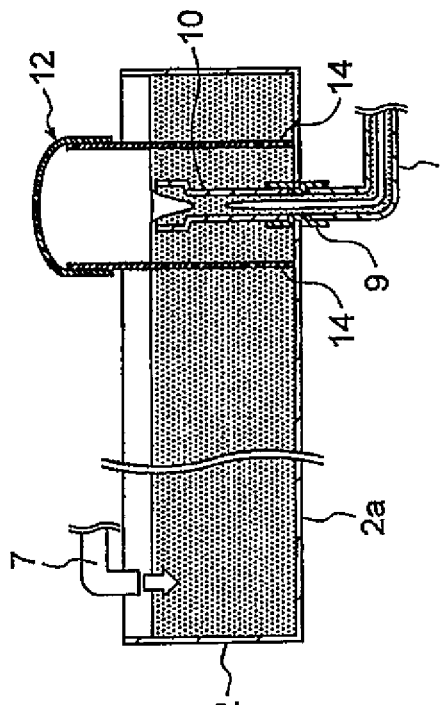
FIG. 5(a) WATER INJECTION
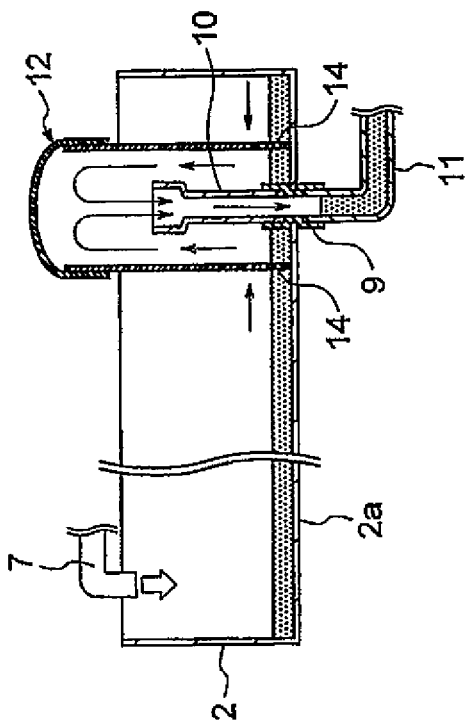
FIG. 5(b) IMMEDIATELY BEFORE WATER DISCHARGE
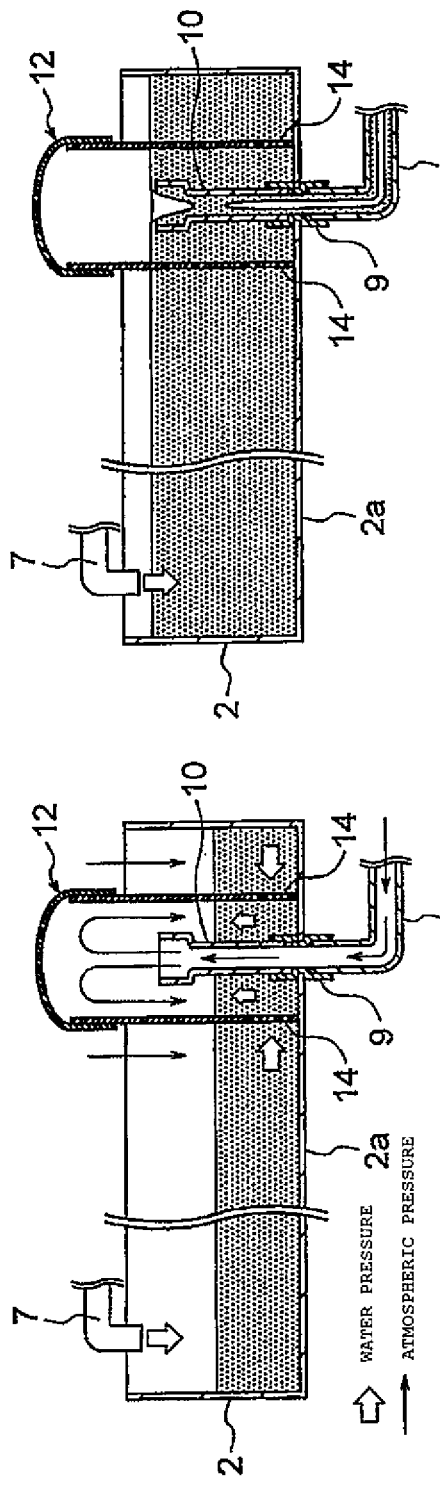
FIG. 5(c) WATER DISCHARGE
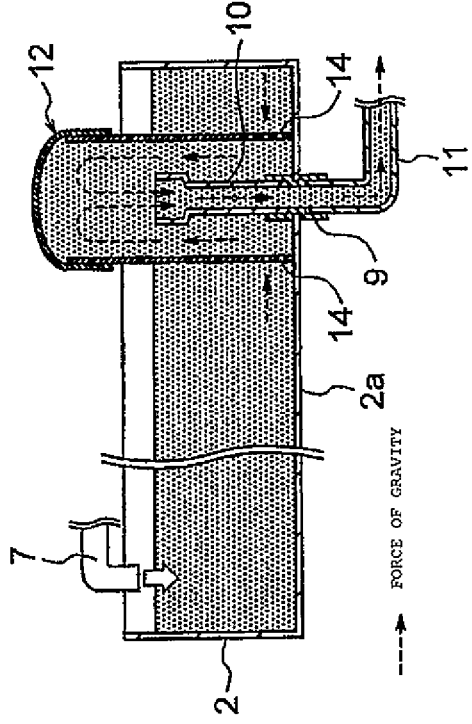
FIG. 5(d) COMPLETION OF WATER DISCHARGE

AQUAPONICS SYSTEM, AND FISH AND SHELLFISH REARING AND PLANT CULTIVATION METHOD USING THE AQUAPONICS SYSTEM

TECHNICAL FIELD

The present invention relates to an aquaponics system including a fish and shellfish rearing apparatus and a hydroponic cultivation apparatus integrated with each other, and to a fish and shellfish rearing and plant cultivation method using the system.

BACKGROUND ART

An aquaponics system is capable of performing both culture (rearing) of fish and shellfish and cultivation of a plant in parallel. Therefore, the aquaponics system is drawing attention and has started being put into practical use.

The aquaponics system includes growing beds configured to cultivate a plant, and a fish and shellfish rearing tank (hereinafter referred to as "rearing tank"). The aquaponics system can perform rearing of fish and shellfish in the rearing tank and cultivation of a plant in the growing beds in parallel by supplying a liquid in the rearing tank to each of the growing beds with a pump, and causing the liquid in the growing beds to circulate into the rearing tank.

As the related-art aquaponics systems, there are given systems disclosed in Patent Literatures 1 to 5.

In Patent Literature 1, there is a disclosure of a modular aquaponics assembly. There is also a disclosure of an aquaponics system including bell siphons and multi-layer trays. However, in Patent Literature 1, there is no disclosure that a liquid is caused to fall with the bell siphons, to thereby aerate a liquid in a water tank with the falling water stream.

In Patent Literature 2, there is a disclosure that discharged water from a water tank module is caused to flow into a module for gardening, and a plant is cultivated with the water, a part of which is filtered. There is also a disclosure of the use of bell siphons. However, the module for gardening of this invention is installed at a position lower than the water level of the water tank module, and hence there is no disclosure that a water tank for rearing is subjected to appropriate aeration with the discharged water falling from the bell siphons.

In Patent Literature 3, there is a disclosure of a vertical aquaponics vegetable garden system. However, there is neither a disclosure that this system includes multi-layer growing beds nor a disclosure that this system includes a water discharge system using bell siphons. Further, there is no disclosure that a liquid in a water tank is subjected to sufficient aeration.

In Patent Literature 4, there is a disclosure of an aquaponics system including a water tank for aquatic animals, a plant growing device, a biological filter, and a biological waste digestion unit and a method. However, there is no disclosure that this system causes discharged water from multi-layer cultivation growing beds to fall onto a water tank for rearing fish with bell siphons to perform aeration.

In Patent Literature 5, there is a disclosure of a vertical aquaponics system, and there is also a disclosure of bell siphons. However, this system is not a water tank for rearing fish, but a system configured to pipe water from the ecosystem of an existing pond or lake. Further, the bell siphons do not discharge water into a water tank for rearing fish to cause aeration in the water tank for rearing fish.

CITATION LIST

Patent Literature

[PTL 1] US 2013/0047508 A1
[PTL 2] US 2014/0041594 A1
[PTL 3] US 2013/0160363 A1
[PTL 4] US 2014/0047767 A1
[PTL 5] US 2013/0098303 A1

SUMMARY OF INVENTION

Technical Problem

An object of the present invention is to perform rearing of fish and shellfish and cultivation of a plant during liquid circulation through use of cultivation beds in two or more stages. A plant cultivation system is a closed type plant cultivation system.

A liquid in a rearing tank and a liquid in a water storage tank are caused to circulate, and the water quality thereof is managed, to thereby enhance a rearing environment and a plant cultivation environment.

Solution to Problem

[Aquaponics System 1]

An aquaponics system of the present invention is an aquaponics system including a rearing system and a cultivation system integrated with each other, the aquaponics system including a rearing tank of the rearing system and cultivation beds of the cultivation system. The cultivation beds are arranged in two or more stages in a vertical direction. A liquid in the rearing tank is supplied to the multi-stage cultivation beds in two or more stages, and the liquid in the cultivation beds is returned to the rearing tank, thereby circulating through a rearing and cultivation circulating system of the rearing tank, the cultivation beds, and the rearing tank. Fish and shellfish can be reared in the rearing tank and a plant can be cultivated in the cultivation beds, with the circulating liquid.

[Aquaponics System 2]

The aquaponics system of the present invention may include a cultivation circulating system in which a liquid in a water storage tank circulates through the water storage tank, the cultivation beds, and the water storage tank, and a rearing circulating system in which a liquid in the rearing tank circulates through the rearing tank, the water storage tank, and the rearing tank. Liquid circulation may be performed concurrently in both the circulating systems, to thereby perform cultivation of a plant with the liquid circulating through a cultivation circulating path and concurrently perform rearing of fish and shellfish with the liquid circulating through the rearing circulating system.

[Aquaponics System 3]

The aquaponics system of the present invention is the above-mentioned aquaponics system 1 or 2, in which the cultivation system may be a closed circulation type (indoor) cultivation system. In this case, an illuminator may be arranged in the cultivation system so that the illuminator is capable of illuminating the plant cultivated in the cultivation beds, to thereby accelerate photosynthesis.

[Aquaponics System 4]

The aquaponics system of the present invention is any one of the above-mentioned aquaponics systems 1 to 3, which may include both or any one of a water quality management device configured to manage water quality of the liquid in the rearing tank and an environment improvement device configured to improve a plant cultivation environment.

[Aquaponics System 5]

The aquaponics system of the present invention may include an air supply device configured to aerate the liquid in the rearing tank or the water storage tank. The air supply device may be bell siphons or other air suppliers mounted on the cultivation beds.

[Aquaponics System 6]

The aquaponics system of the present invention may include both or any one of a physical filtration device and a biological filtration device in the rearing and cultivation circulating system or the rearing circulating system. In this case, a sterilization device may also be added. The physical filtration device is a filtration device configured to filter a solid substance in the rearing tank or the water storage tank, and the biological filtration device is a filtration device configured to perform nitrification of converting at least an ammonia component in the liquid in the rearing tank or the water storage tank into a nitrite and converting the nitrite into a nitrate.

[Fish and Shellfish Rearing and Plant Cultivation Method 1]

A fish and shellfish rearing and plant cultivation method of the present invention involves rearing fish and shellfish in the rearing tank and cultivating a plant in the multi-stage cultivation beds through use of any one of the above-mentioned aquaponics systems 1 to 6.

[Fish and Shellfish Rearing and Plant Cultivation Method 2]

The fish and shellfish rearing and plant cultivation method of the present invention may involve causing the liquid to circulate through the cultivation circulating system to cultivate the plant in the cultivation beds and further causing the liquid to circulate also through the rearing circulating system to rear the fish and shellfish in the rearing tank through use of the above-mentioned aquaponics system 2.

[Fish and Shellfish Rearing and Plant Cultivation Method 3]

The fish and shellfish rearing and plant cultivation method of the present invention may involve, in the case where the cultivation system is a closed circulation type (indoor) cultivation system, illuminating the plant with the illuminator during cultivation in the cultivation beds, to thereby accelerate photosynthesis.

[Fish and Shellfish Rearing and Plant Cultivation Method 4]

The fish and shellfish rearing and plant cultivation method of the present invention may involve managing water quality of the liquid in the rearing tank or the water storage tank and rearing the fish and shellfish and cultivating the plant with the managed liquid.

[Fish and Shellfish Rearing and Plant Cultivation Method 5]

The fish and shellfish rearing and plant cultivation method of the present invention may involve aerating the liquid in the rearing tank or the water storage tank, to thereby perform rearing of fish and shellfish and cultivation of a plant with the liquid containing air. In this case, the liquid in the cultivation bed in each of the stages may be caused to fall onto the liquid in the rearing tank or the water storage tank with the bell siphons and stir the liquid in the rearing tank or the water storage tank, to thereby aerate the liquid, or may also involve causing the liquid in the rearing tank or the water storage tank to foam with the air supplier, to thereby aerate the liquid.

[Fish and Shellfish Rearing and Plant Cultivation Method 6]

The fish and shellfish rearing and plant cultivation method of the present invention may also involve, during circulation in the rearing and cultivation circulating system or during circulation in the rearing circulating system, performing both or any one of filtration of removing (filtering) a solid substance in the liquid and biological filtration of nitrification of converting at least an ammonia component in the liquid into a nitrate. The liquid during circulation may also be sterilized as necessary.

Advantageous Effects of Invention

The aquaponics system of the present invention has the following effects.

(1) The cultivation beds are arranged in multiple stages in the vertical direction, and hence the plant cultivation area is enlarged even in a narrow space.

(2) The liquid purified in plant cultivation is caused to circulate into the rearing tank, and hence the liquid suitable for rearing fish and shellfish is allowed to circulate into the rearing tank.

(3) The water quality management device is arranged, and hence an environment preferred for rearing of fish and shellfish and cultivation of a plant can be created.

(4) The cultivation system is a closed circulation type (indoor) hydroponic cultivation system, and hence the cultivation system is less liable to be influenced by an external temperature or to be harmed by pests.

(5) The illuminator is arranged in the cultivation system so that the illuminator is capable of illuminating the plant cultivated in the cultivation beds, to thereby accelerate photosynthesis, and hence the growth of the plant can be accelerated.

(6) The air supply device is arranged. Therefore, the liquid in the rearing tank can be aerated to increase dissolved oxygen in the liquid, and oxygen can be supplied in a manner preferred for rearing of fish and shellfish and cultivation of a plant.

(7) Both or one of the physical filtration device and the biological filtration device is arranged in the circulating system. Therefore, a solid substance in the rearing tank is filtered, and ammonia is nitrified into nitrous acid required for cultivating the plant. Thus, even the liquid in the rearing tank can be changed into a liquid suitable for cultivating the plant and supplied to the cultivation beds.

(8) When the sterilization device is added, the circulating liquid is sterilized. Therefore, the liquid that is hygienic for rearing of fish and shellfish and cultivation of a plant can be supplied.

The fish and shellfish rearing and plant cultivation method using the aquaponics system of the present invention have the following effects.

Any one of the above-mentioned aquaponics systems is used, and hence the effects of the aquaponics systems can be obtained.

BRIEF DESCRIPTION OF DRAWINGS

FIG. 5(a), FIG. 5(b), FIG. 5(c), and FIG. 5(d) are each an explanatory view of liquid discharge with the bell siphon.

DESCRIPTION OF EMBODIMENTS

Embodiments of an aquaponics system of the present invention and a fish and shellfish rearing and plant cultivation method (hereinafter referred to as "rearing and cultivation method") using the system are described below.

(Aquaponics System According to Embodiment 1)

Figure 1:
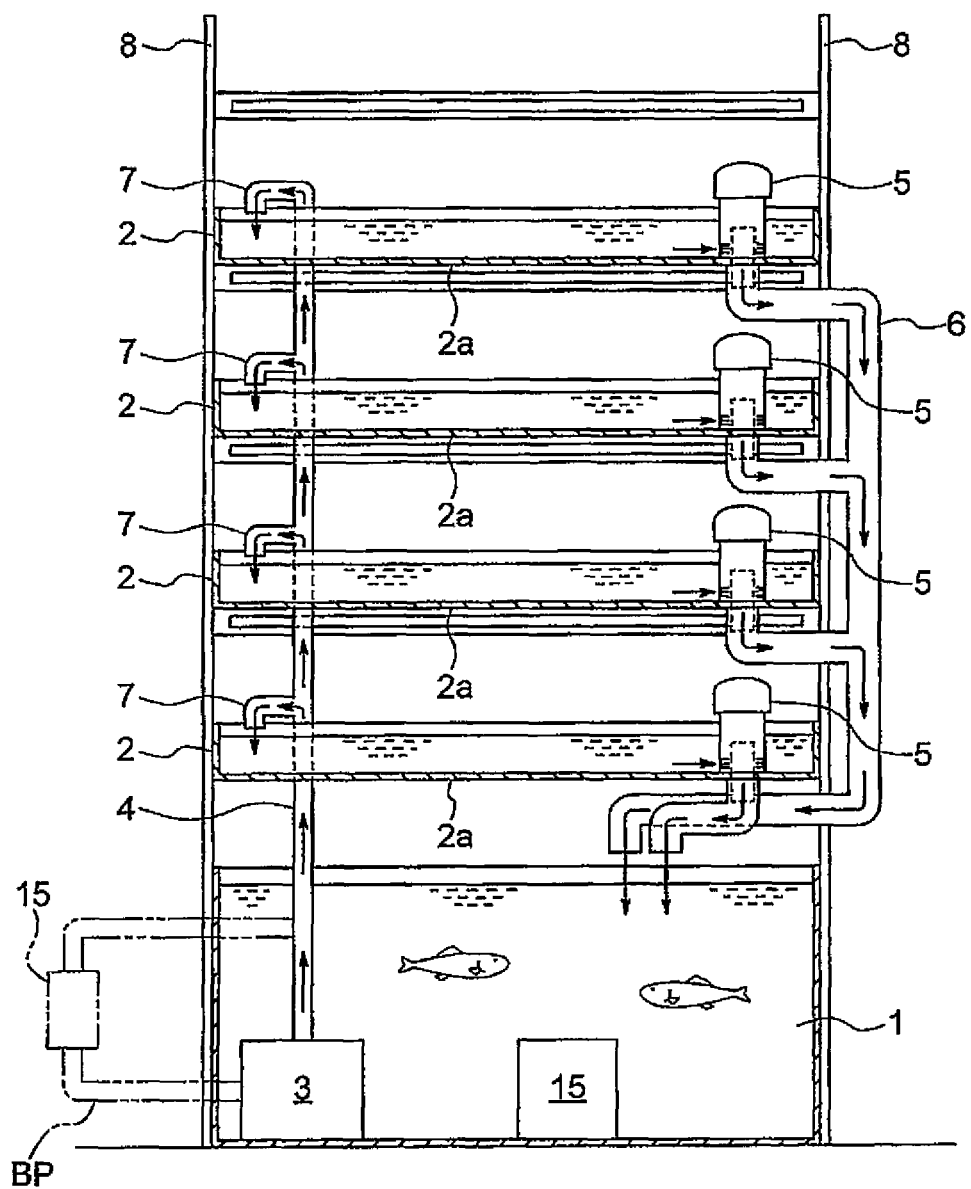
FIG. 1 is a front view for illustrating an example of an aquaponics system of the present invention.

An aquaponics system of the present invention illustrated as an example in FIG. 1 includes a rearing tank 1 for rearing fish and shellfish, cultivation beds 2 for cultivating a plant, which are arranged in multiple stages at intervals in a vertical direction, a water supply pump 3 configured to pump a liquid in the rearing tank 1 to supply the liquid to the cultivation bed 2 in each of the stages, a water supply pipe 4 configured to supply the liquid in the rearing tank 1 pumped with the water supply pump 3 to the cultivation beds 2, bell siphons 5 configured to discharge the liquid in the cultivation bed 2 in each of the stages, and a water discharge pipe 6 configured so that the discharged liquids discharged from the bell siphons 5 are merged and caused to fall onto the rearing tank 1.

[Rearing Tank]

As the rearing tank 1, a rearing tank which is the same as that of a conventional closed circulation type land culture system or a rearing tank having a novel structure, material, and shape may be used. The size of the rearing tank 1 is a size (capacity) suitable for rearing fish and shellfish, and has a size and a depth capable of storing a liquid that can be supplied to the multi-stage cultivation beds 2. The rearing tank 1 made of a resin is suitable from the viewpoint of reduction in weight. In FIG. 1, the rearing tank 1 is installed at a position lower than the cultivation bed 2 in the lowest stage, but the rearing tank 1 may be installed at another position as long as the discharged liquid from the cultivation beds 2 can fall onto the rearing tank 1. For example, the rearing tank 1 may be buried in the ground or may also be arranged indoors or outdoors.

[Water Supply Pump]

The liquid in the rearing tank 1 is pumped with the water supply pump 3 and supplied to the cultivation beds 2 through the water supply pipe 4. As the water supply pump 3, a circulation pump which is the same as that used in the conventional closed circulation type land culture system or a pump having a novel structure and function may be used. Pumping horsepower, pumping capacity, and the like are set so that a liquid required for cultivating a plant can be supplied to the multi-stage cultivation beds 2.

[Water Supply Pipe]

The water supply pipe 4 is connected to the water supply pump 3 and includes distribution pipes 7 so as to supply the liquid in the rearing tank 1 pumped with the water supply pump 3 to the cultivation bed 2 in each of the stages. As the water supply pipe 4, a pipe made of a resin or a metal may be used.

[Cultivation Bed]

As the cultivation bed 2, a cultivation bed which is the same as that used in a conventional closed circulation type hydroponic cultivation system or a cultivation bed having a novel structure, material, and shape may be used. The size, depth, length, and lateral width of the cultivation bed 2 are set to be suitable for plant cultivation. The cultivation bed 2 made of a resin is suitable from the viewpoint of reduction in weight. Soil for plant cultivation, for example, Hydroton, black cinder, vermiculite, perlite, rock wool, coco peat, Bakelite, and other culture soils, or a combination thereof may or may not be laid on the bottom of the cultivation bed 2. The number of stages of the cultivation beds 2 is selected so as to achieve such a scale that the cultivation amount of a plant can be managed. The multi-stage cultivation beds 2 may be fixed to a rack 8 or installed on the rack 8 so as to be removed therefrom.

Although the cultivation beds 2 may be installed outdoors, the cultivation beds 2 may also be installed in a room that cannot let in sunlight, to thereby forma closed circulation type cultivation system. The closed circulation type cultivation system is a general-purpose system configured to cultivate a plant by installing a cultivation system in a room that hardly lets in or cannot let in sunlight and subjecting the plant to illumination with artificial light. Plant cultivation performed in the cultivation beds 2 may be any of thin film hydroponic cultivation called nutrient film technique (NFT), deep flow hydroponic cultivation called deep water culture (DWC), pebble cultivation called Ebb & Flow, and other cultivation methods. The bell siphons 5 are used for discharging water generally in the pebble cultivation (may also be used in the deep flow hydroponic cultivation), and overflowed water is simply discharged in the other methods. The present invention may use a drip ventilation system, which is frequently used in strawberry cultivation and the like, and may also use any of the other systems.

[Illuminator]

When the closed circulation type cultivation system is adopted, it is necessary in the present invention that an illuminator (not shown) be mounted on the cultivation beds 2 or the rack 8 so as to accelerate photosynthesis of a cultivation plant with illumination from the illuminator. As the illuminator, various light-emitting tools, such as an LED, an electric bulb, a fluorescent lamp, a high-pressure sodium lamp, a metal halide lamp, and a plasma light, may be used. The illuminator is arranged so as to uniformly illuminate the plant during cultivation. The illuminator may be arranged on the cultivation beds 2 in all the stages or any of the stages.

[Bell Siphon]

The bell siphon 5 is mounted on a bottom surface 2a of the cultivation bed 2 in each of the stages and is configured to collect a liquid (cultivation liquid) in the cultivation bed 2 to discharge the liquid outside. In FIG. 1, the bell siphon 5 is connected to the cultivation bed 2 in each of the stages, and the bell siphon 5 in each of the stages is connected to the water discharge pipe 6 so that a liquid discharged from the bell siphon 5 in each of the stages falls onto the rearing tank 1 through the water discharge pipe 6. The liquid in the rearing tank 1 is aerated with the falling discharged liquid (the liquid in the rearing tank 1 is stirred, and oxygen is supplied (air is supplied) to the liquid to increase dissolved oxygen).

Figure 3:
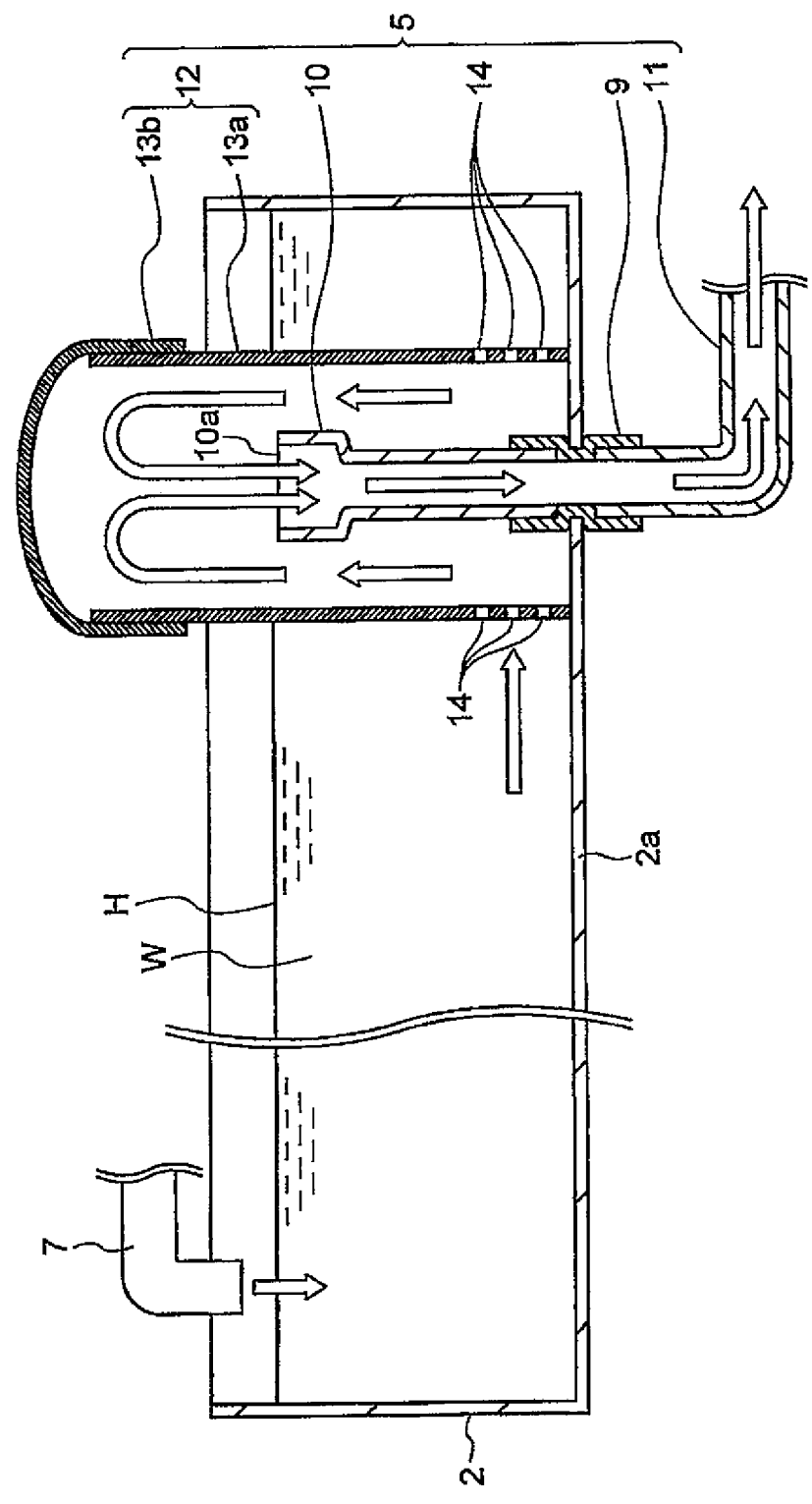
FIG. 3 is an explanatory view of a bell siphon in the aquaponics system of the present invention.
Figure 4:
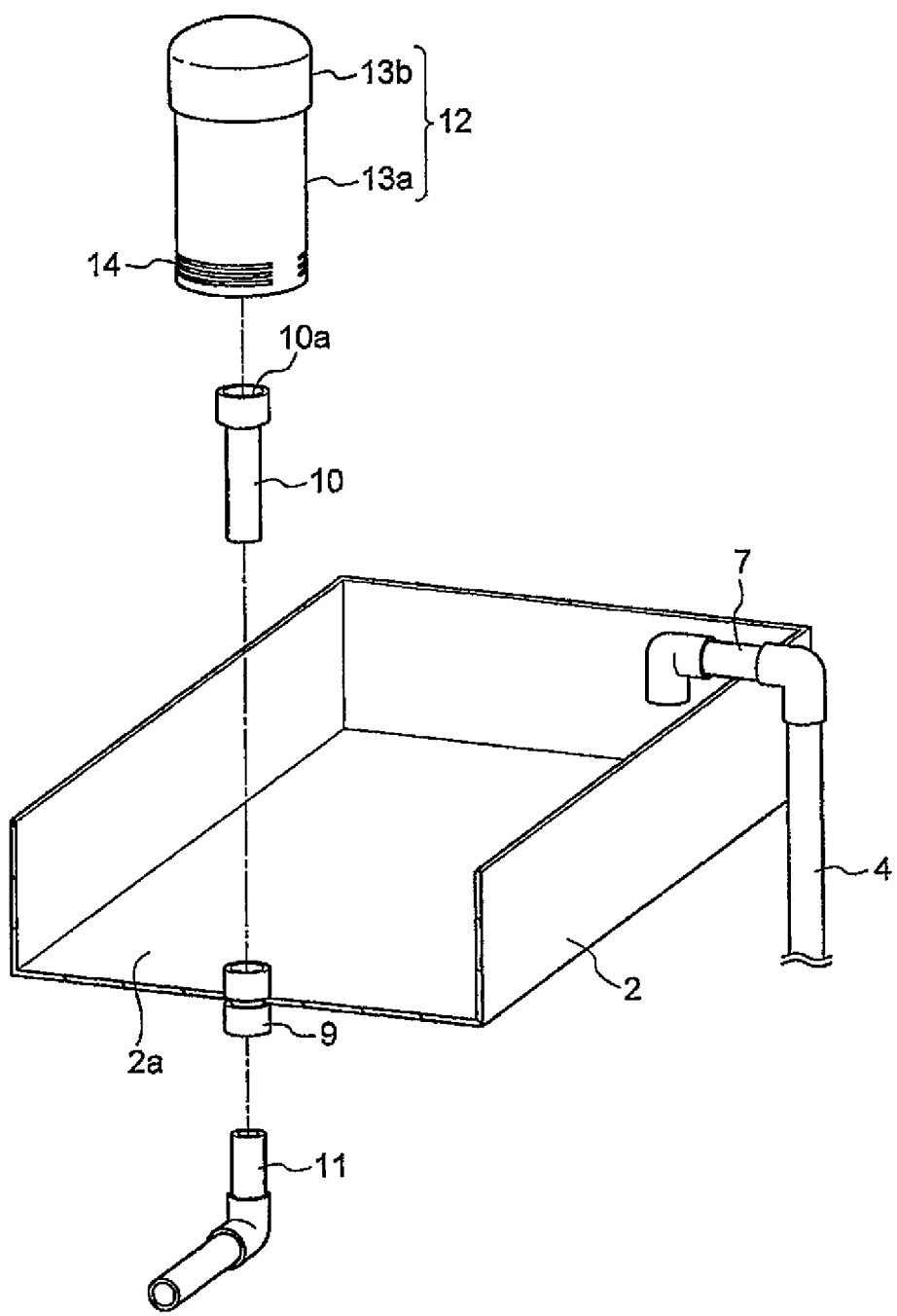
FIG. 4 is an exploded explanatory view of the bell siphon.

As an example, the bell siphon 5 illustrated in FIG. 3 includes a support pipe 9 (FIG. 4) that is fixed to the bottom surface 2a of the cultivation bed 2 so as to pass therethrough, an introduction pipe 10 that is inserted into the support pipe 9 from above so as to protrude in the cultivation bed 2, an outflow pipe 11 that is inserted into the support pipe 9 from below so as to protrude outside of the cultivation bed 2, a standpipe 13a that covers an outer periphery of the introduction pipe 10, and a cap 13b that covers an upper portion of the standpipe 13a. In the present invention, the stand pipe 13a and the cap 13b form a bell 12. The bell 12 is designed to protrude above a water surface H of a liquid W in the cultivation bed 2. Inflow ports 14 are opened on a lower end side of a peripheral wall of the stand pipe 13a so that the liquid W in the cultivation bed 2 flows into the stand pipe 13a. The inflow port 14 may have any shape, for example, a groove and a hole. The number of the grooves and the holes may be arbitrarily designed in accordance with a water discharge amount, and an opening position may also be any axial position of the stand pipe 13a. A water discharge amount of the bell siphon 5 is designed in accordance with a water discharge amount of the cultivation bed 2.

[Water Discharge with Bell Siphon]

When the liquid W in the cultivation bed 2, which has flowed into the stand pipe 13a through the inflow ports 14 of the stand pipe 13a (FIG. 5(a)), is accumulated in the stand pipe 13 and reaches a position higher than an upper end surface (inlet) 10a of the introduction pipe 10 (FIG. 5(b)), excess water automatically flows into the introduction pipe 10 through the inlet 10a and is discharged from the outflow pipe 11 to the water discharge pipe 6 (FIG. 5(d)). In the case where the liquid is intermittently supplied to the cultivation bed 2, when the excess water is discharged as illustrated in FIG. 5(d), the water level in the standpipe 13a lowers. Meanwhile, in the case where the liquid is continuously supplied to the cultivation bed 2, even when the liquid is discharged, the water level in the stand pipe 13a is kept at a position higher than the inlet 10a of the introduction pipe 10 as illustrated in FIG. 5(c).

[Water Discharge Pipe]

As the water discharge pipe 6, an existing pipe made of a resin or a metal may be used. The water discharge pipe 6 is configured so that liquids discharged from the bell siphon 5 in the stages are merged and caused to fall onto the rearing tank 1. In FIG. 1, the bell siphon 5 arranged in the cultivation bed 2 in the lowest stage is not connected to the water discharge pipe 6 so as to cause the liquid to fall onto the rearing tank 1 directly, and the bell siphons 5 arranged in the cultivation beds 2 in the second and subsequent stages from the bottom are connected to the water discharge pipe 6 so that the liquids are merged in the water discharge pipe 6 and caused to fall onto the rearing tank 1.

[Physical Filtration Device and Biological Filtration Device]

The liquid in the rearing tank 1 contains excreta from fish and shellfish during rearing, leftovers (residues) of feed, other solid substances, ammonia, and the like. It is desired that the solid substances such as excreta and leftovers of feed be filtered with a physical filtration device, and ammonia ($NH_3$) be nitrified into a nitrite ($NO_2$) and then to a nitrate ($NO_3$) with a biological filtration device (bioreactor). The nitrate ($NO_3$) is an element important for growth of a plant.

<Physical Filtration Device>

As the physical filtration device, a swirl filter, a radial filter, a screen filter, a sponge, and the like may be used alone or in combination thereof. The physical filtration device may be installed in the rearing tank 1 or in any position of the rearing and cultivation circulating system in which the liquid in the rearing tank 1 circulates through the rearing tank 1, the cultivation beds 2, and the rearing tank 1.

(Biological Filtration Device)

As the biological filtration device, an existing biological filtration device may be used. The biological filtration device may be installed in the rearing tank 1 or in any position of the rearing and cultivation circulating system in which the liquid in the rearing tank 1 circulates through the rearing tank 1, the cultivation beds 2, and the rearing tank 1.

[Water Quality Management Device]

It is desired that a liquid suitable for rearing of fish and shellfish and cultivation of a plant be used. A pH value, an electric conductance (EC), a liquid temperature, dissolved oxygen, and the like of the liquid vary depending on rearing of fish and shellfish and cultivation of a plant. In the present invention, a water quality management device 15 (FIG. 1) configured to manage the water quality of the liquid in the rearing tank 1 may be arranged. The water quality management device is configured to measure a pH, an EC, a component in a liquid, and the like with a reagent, a sensor, or the like and adjust them. The water quality management device 15 may also include a warming device, a sterilization device, an air supply device, and the like. In FIG. 1, the water quality management device 15 is arranged in the rearing tank 1, but the water quality management device 15 may be installed at another position as long as the liquid in the rearing tank 1 can be managed.

[pH Adjustment Device]

A pH adjustment device is configured to adjust a pH value of the liquid in the rearing tank 1. As the pH adjustment device, a pH adjuster, which is capable of detecting a pH value of the liquid in the rearing tank 1 with a sensor and adjusting the detected pH value into a pH value suitable for rearing of fish and shellfish and cultivation of a plant, may be used.

[EC Adjustment Device]

EC adjustment involves measuring an EC of a liquid with an existing EC measurement device and automatically or artificially adjusting the measurement result based on a predetermined value so that the EC reaches the predetermined value. An EC may be measured through use of an existing EC measurement instrument.

[Warming Device]

A warming device is configured to warm a liquid when a liquid temperature is low, and a temperature measurement instrument may be used for measuring a liquid temperature, and an immersion type heater or other heaters may be used for heating a liquid. In this case, a control device, a temperature regulating device, and the like, which are configured to perform drive control of the warming device based on a measured temperature and regulate a preset temperature, may be arranged.

[Sterilization Device]

A sterilization device is configured to sterilize bacteria, viruses, algae, and the like in the liquid in the rearing tank 1, and for example, an ultraviolet sterilization device, an ozone sterilization device, and other sterilization devices may be used. The sterilization device may be arranged in the rearing tank 1 or in any position of the above-mentioned circulating system.

[Air Supply Device]

When the above-mentioned liquid is lacking in dissolved oxygen, air may be supplied to the liquid from the air supply device to feed oxygen to the liquid. The air supply device is configured to maintain or increase dissolved oxygen in the liquid in the rearing tank 1 and stir the liquid to supply oxygen in ambient air to the liquid (perform aeration). An air pump or a nanobubble generation device may be used, and stirring of a liquid may be performed by causing a liquid discharged from the cultivation bed 2 to fall onto the liquid in the rearing tank 1.

[Environment Improvement Device]

In the present invention, various environment improvement devices configured to improve a rearing environment and a plant cultivation environment, such as a carbon dioxide generation device and an air stream generation device, may also be arranged in addition to the above-mentioned devices.

<Carbon Dioxide Generation Device>

A carbon dioxide generation device is configured to generate carbon dioxide ($CO_2$) to supply the carbon dioxide to air around the cultivation beds 2, to thereby accelerate photosynthesis.

<Air Stream Generation Device>

An air stream generation device is configured to generate wind, and a fan, an air conditioner, or the like may be used. The generated wind is used for improving the ventilation of the circumference of the cultivation beds 2. In addition, the air stream generation device may also adjust a temperature and humidity in a room.

The environment improvement device, for example, the carbon dioxide generation device and the air stream generation device may be installed in a room in which a plant is cultivated or outside the room. The occurrence of pests may also be suppressed by improving the ventilation of a plant cultivation environment and adjusting the temperature and humidity in the room.

As a liquid for plant cultivation, a liquid obtained by blending three major elements of nitrogen, phosphoric acid, and potassium with other essential elements, such as calcium and magnesium, and useful elements, such as sodium and silicon, depending on the kind of the plant, may be used. As the liquid, for example, a chemical liquid fertilizer, such as Otsuka House or Hyponica, may be used. In the case of an aquaponics system of organic cultivation that does not use a chemical liquid fertilizer, sufficient nitrogen (nitrate) is supplied through the nitrification action of the liquid in the rearing tank 1. However, the liquid is liable to be lacking in phosphoric acid, potassium, and the like, and hence it is desired to supplement the liquid with those elements through use of an organic supplement and the like.

In the aquaponics system of FIG. 1, a bypass passage BP may be arranged as represented by the imaginary line in FIG. 1, and the physical filtration device, the biological filtration device, the sterilization device, the water quality management device 15, and the like may also be arranged in the bypass passage BP.

[Rearing and Cultivation Method using System of FIG. 1]

Fish and shellfish are reared in the rearing tank 1, and a plant is cultivated in the cultivation beds 2, through use of the aquaponics system illustrated in FIG. 1, as described below. The liquid in the rearing tank 1 is pumped with the water supply pump 3 to be fed to the water supply pipe 4, and the liquid is branched into the distribution pipes 7 from the water supply pipe 4 to be supplied to the cultivation bed 2 in each of the stages. Further, the liquid in the cultivation beds 2 is collected with the bell siphons 5 to be fed to the water discharge pipe 6 and caused to fall onto the rearing tank 1 through the water discharge pipe 6. In this case, the liquid in the cultivation bed 2 in the lowest stage is caused to fall onto the rearing tank 1 directly from the bell siphon 5 mounted on the cultivation bed 2 in the lowest stage. The liquid in the rearing tank 1 is stirred with the falling discharged liquid, and oxygen in ambient air is supplied to the liquid in the rearing tank 1 (the liquid in the rearing tank 1 is aerated). In this case, the liquids from the cultivation bed 2 in the stages are merged in the water discharge pipe 6 and caused to fall onto the rearing tank 1. Therefore, the discharged liquid becomes a relatively strong water stream, thereby being able to aerate the liquid in the rearing tank 1 sufficiently. The liquid in the rearing tank 1 is pumped with the water supply pump 3 and caused to circulate through the system of the water supply pipe 4, the cultivation beds 2, the bell siphons 5, the water discharge pipe 6, and the rearing tank 1, to thereby perform rearing of fish and shellfish and cultivation of a plant. During this time, it is desired that water quality management of the liquid in the rearing tank 1, refilling of the liquid in a required amount, replacement of the contaminated liquid, and the like be performed. The liquid may be pumped with the water supply pump 3 continuously or intermittently under the control of time with a timer.

(Aquaponics System According to Embodiment 2)

Figure 2:
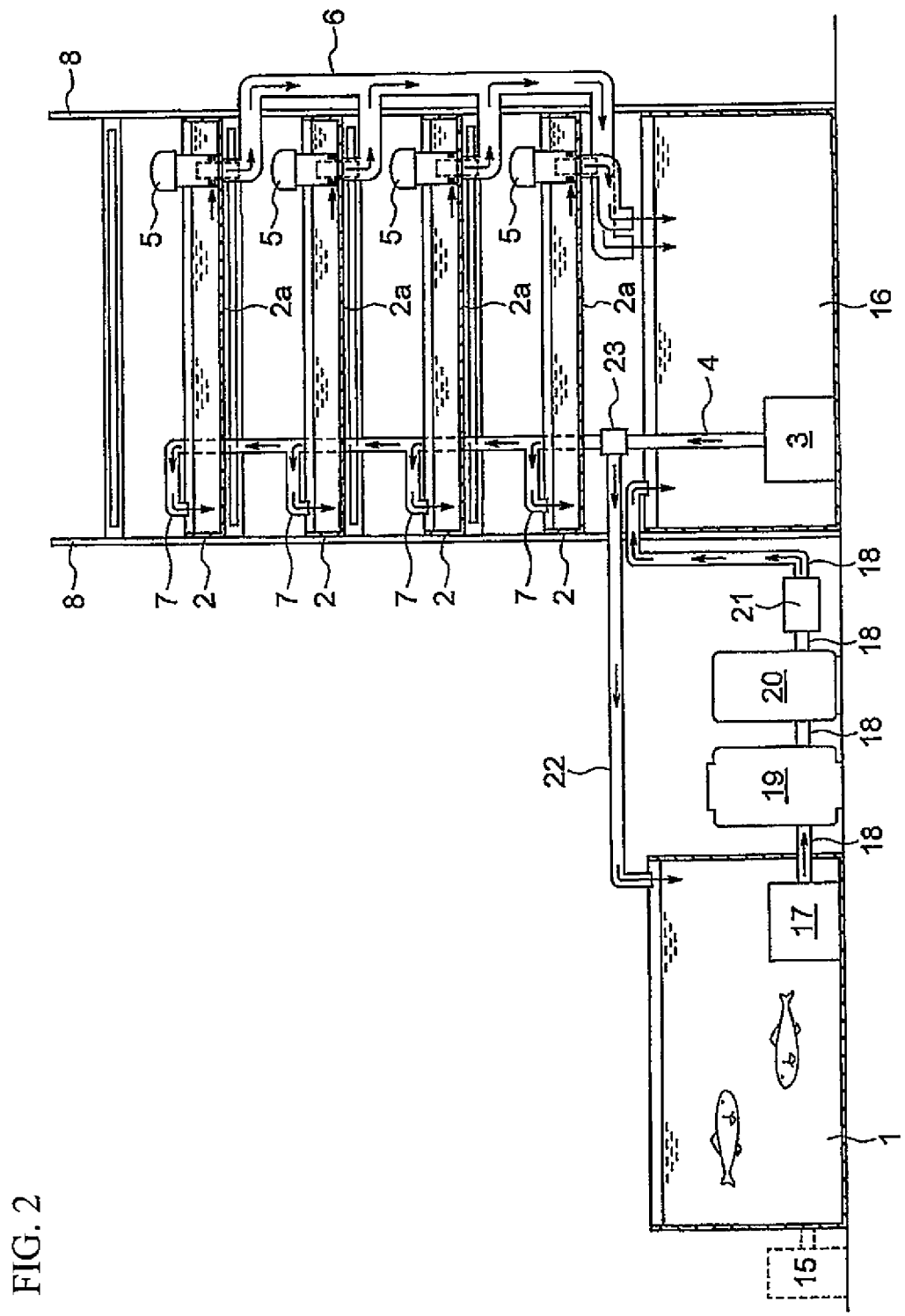
FIG. 2 is a front view for illustrating another example of the aquaponics system of the present invention.

The aquaponics system of the present invention illustrated as another example in FIG. 2 includes the rearing tank 1, the multi-stage cultivation beds 2, the water supply pump 3, the water supply pipe 4, the bell siphons 5, and the water discharge pipe 6 in the same manner as in Embodiment 1 illustrated in FIG. 1. The aquaponics system of the present invention according to another example further includes a water storage tank 16, a circulation pump 17, a feed passage 18, a physical filtration device 19, a biological filtration device 20, a sterilization device 21, and a return passage 22.

As the rearing tank 1, the cultivation beds 2, the water supply pump 3, the water supply pipe 4, the bell siphons 5, and the water discharge pipe 6, the same constituent members as those in FIG. 1 may be used.

The circulation pump 17 is configured to feed the liquid in the rearing tank 1 to the water storage tank 16 through the feed passage 18, and a general-purpose underwater pump, a ground installation type pumping-up pump, or the like may be used.

In FIG. 2, the liquid in the water storage tank 16 may be caused to circulate through a cultivation circulating system of the water supply pump 3, the cultivation beds 2, and the water storage tank 16. Concurrently, the liquid in the rearing tank 1 may also be caused to circulate through a rearing circulating system of the circulation pump 17, the feed passage 18, the physical filtration device 19, the biological filtration device 20, the sterilization device 21, the water storage tank 16, the water supply pump 3, and the return passage 22. In this case, the liquid pumped with the water supply pump 3 is fed to both the return passage 22 and the water supply pipe 4. Therefore, a regulation valve 23 (FIG. 2) is arranged in a branched portion between the return passage 22 and the water supply pipe 4 so as to regulate the water supply amount to the return passage 22 and the water supply pipe 4 with the regulation valve 23. The liquid may also be returned to the return passage 22 through a return dedicated pump (return pump) separate from the water supply pump 3.

In FIG. 2, the water storage tank 16 is arranged below the cultivation bed 2 in the lowest stage, and the liquid in the multi-stage cultivation beds 2 is caused to fall onto the water storage tank 16 through the bell siphons 5 and the water discharge pipe 6, to thereby aerate the liquid in the water storage tank 16. In this case, the discharged liquid from the cultivation bed 2 in the lowest stage is caused to fall onto the water storage tank 16 directly from the bell siphon 5 without passing through the water discharge pipe 6.

The physical filtration device 19 and the biological filtration device 20 are arranged at some midpoints of the feed passage 18. In FIG. 2, the physical filtration device 19 is arranged on the circulation pump 17 side (front side in the feed direction), and the biological filtration device 20 is arranged on the water storage tank 16 side (destination side in the feed direction) with respect to the physical filtration device 19. However, the arrangement of the physical filtration device 19 and the biological filtration device 20 may be reversed. Only one of the physical filtration device 19 and the biological filtration device 20 may be arranged as long as sufficient filtration can be performed. The physical filtration device 19 and the biological filtration device 20 are the same as those in Embodiment 1.

[Illuminator]

The aquaponics system of FIG. 2 may also be a closed circulation type cultivation system, and an illuminator may be mounted to accelerate photosynthesis of a cultivation plant with illumination from the illuminator. The illuminator in this case may also be the same as that in the case of Embodiment 1.

[Physical Filtration Device, Biological Filtration Device, Water Quality Management Device, and Environment Improvement Device]

In the aquaponics system of FIG. 2, the physical filtration device, the biological filtration device, the water quality management device, and the environment improvement device may also be arranged in the same manner as in the aquaponics system according to Embodiment 1.

[Rearing and Cultivation Method using System of FIG. 2]

Rearing of fish and shellfish and cultivation of a plant are performed through use of the aquaponics system illustrated in FIG. 2 in the same manner as in the case of using the aquaponics system of FIG. 1. In FIG. 2, the liquid in the water storage tank 16 is pumped with the water supply pump 3 and fed to the water supply pipe 4, and the liquid is fed from the water supply pipe 4 to the cultivation bed 2 in each of the stages, to thereby cultivate a plant in the cultivation bed 2. The liquid in the cultivation beds 2 is caused to fall onto the water storage tank 16 from the bell siphons 5 through the water discharge pipe 6. The liquid in the cultivation bed 2 in the lowest stage may be caused to fall onto the water storage tank 16 directly from the bell siphon 5 mounted on the cultivation bed 2 in the lowest stage. The liquid in the water storage tank 16 is aerated with the falling liquid. The liquid having dissolved oxygen increased by the aeration is pumped with the water supply pump 3 and fed to the return passage 22, and the liquid is supplied from the return passage 22 to the rearing tank 1, to thereby rear fish and shellfish in the rearing tank 1. The liquid in the rearing tank 1 is fed to the feed passage 18 with the circulation pump 17 and fed to the physical filtration device 19, the biological filtration device 20, the sterilization device 21, and the water storage tank 16. During this time, the water quality is managed in the same manner as in Embodiment 1, to thereby improve a plant cultivation environment.

[Refilling of Liquid]

Also in the case of FIG. 2, it is desired that refilling, replacement, and the like of the liquid in the rearing tank 1 be performed. The circulation of the liquid from the water storage tank 16 and the circulation of the liquid from the rearing tank 1 may be performed constantly or regularly (intermittently) at a preset timing.

(Aquaponics System according to Embodiment 3)

The aquaponics system of the present invention may be an aquaponics system other than those illustrated in FIG. 1 and FIG. 2. The number of stages of the cultivation beds 2 may be set to any number other than the illustrated number. The cultivation beds 2 having different sizes and shapes may also be stacked in multiple stages. Two or more rearing tanks 1 and two or more water storage tanks 16 may also be arranged. In this case, the rearing tanks 1 and the water storage tanks 16 may have different sizes and shapes, respectively. The water quality management device may include the above-mentioned equipment and device or may not include a part thereof. For example, both or any one of the physical filtration device 19 and the biological filtration device 20 may also be arranged in two stages. The water storage tank 16 may also be buried in the ground.

(Aquaponics System According to Embodiment 4)

In the aquaponics system illustrated in FIG. 1, the rearing tank 1 is arranged below the cultivation beds 2, and in the aquaponics system illustrated in FIG. 2, the rearing tank 1 and the cultivation beds 2 are arranged at the same height. However, the rearing tank 1 may be arranged above the cultivation beds 2. In this case, the liquid in the rearing tank 1 is caused to fall naturally onto the cultivation beds 2 to supply water thereto, and the discharged water from the cultivation beds 2 is caused to circulate into the rearing tank with a pump.

(Aquaponics System According to Embodiment 5)

The aquaponics system of the present invention may include the aquaponics system illustrated in FIG. 1 or FIG. 2 as a basic unit, and the basic units may be arranged in a lateral direction or in a front-back direction to enlarge the scale of the rearing system and the cultivation system. In this case, the cultivation system in which the cultivation beds 2 are arranged on the rack 8 is used as a basic unit, and the cultivation systems may be arranged in the lateral direction or in the front-back direction, and the rearing tank 1 and the water storage tank 16 each having a large capacity may also be used in accordance with the increased cultivation system. In any of the above-mentioned cases, at least the racks 8 of the cultivation systems arranged in the lateral direction or in the front-back direction may be connected to each other. If possible, the cultivation beds 2 in each unit may be configured to be connectable to each other in the lateral direction or in the front-back direction so as to connect the cultivation beds 2 to each other.

REFERENCE SIGNS LIST 1 rearing tank
2 cultivation bed
2a bottom surface (of cultivation bed)
3 water supply pump
4 water supply pipe
5 bell siphon
6 water discharge pipe
7 distribution pipe
8 rack
9 support pipe
10 introduction pipe
10a upper end surface (inlet) (of the introduction pipe)
11 outflow pipe
12 bell
13a stand pipe
13b cap
14 inflow port (of stand pipe)
15 water quality management device
16 water storage tank
17 circulation pump
18 feed passage
19 physical filtration device
20 biological filtration device
21 sterilization device
22 return passage
23 regulation valve
BP bypass passage
H water surface
W liquid

The invention claimed is:

1. An aquaponics system including a rearing system and a cultivation system integrated with each other, the aquaponics system comprising:
   a rearing tank of the rearing system;
   cultivation beds of the cultivation system;
   a water supply pipe arranged between the rearing tank and the cultivation beds; and
   distribution pipes each arranged so as to extend from the water supply pipe to the cultivation bed in each of the stages,
   wherein the cultivation beds are arranged in two or more stages in a vertical direction,
   the rearing tank has a size and a depth capable of storing a liquid supplied to the cultivation beds in two or more stages,
   the water supply pipe is connected to a pump, and the pump enables the liquid supplied from the rearing tank to the water supply pipe to be supplied to the cultivation bed in each of the stages through each of the distribution pipes,
   each of the cultivation beds includes a bell siphon,
   the bell siphon of each of the cultivation beds has an outlet, the outlets of at least two of the bell siphons being connected to a common water discharge pipe for merging the liquid discharged from the at least two bell siphons into a merged discharge liquid stream,
   the water discharge pipe has a lower end arranged above a liquid surface in the rearing tank so that the merged discharge liquid stream is caused to fall onto the rearing tank, to thereby enable the liquid in the rearing tank to be aerated,
   the aquaponics system thereby forming a rearing and cultivation circulating system in which the liquid circulates through the rearing tank, the pump, the water supply pipe, the distribution pipes, the cultivation beds, the bell siphons, the water discharge pipe, and the rearing tank,
   the rearing and cultivation circulating system includes both or any one of a physical filtration device and a biological filtration device, and
   the liquid circulating through the rearing and cultivation circulating system is capable of rearing fish and shellfish in the rearing tank and cultivating a plant in the cultivation beds.

2. An aquaponics system according to claim 1, wherein the outlets of the bell siphons of some of the cultivation beds are connected to the water discharge pipe, and the outlet of the bell siphon of one of the cultivation beds is free from being connected to the water discharge pipe and is arranged above the rearing tank, and
   the liquid is caused to fall onto the rearing tank through the water discharge pipe and the bell siphon of the one of the cultivation beds which is free from being connected to the water discharge pipe, to thereby enable the liquid in the rearing tank to be aerated.

3. An aquaponics system according to claim 1, wherein the outlets of the bell siphons of all the cultivation beds are connected to the water discharge pipe, and
   the liquid is caused to fall onto the rearing tank through the water discharge pipe, to thereby enable the liquid in the rearing tank to be aerated.

4. An aquaponics system including a rearing system and a cultivation system integrated with each other, the aquaponics system comprising:
   a rearing tank of the rearing system;
   cultivation beds of the cultivation system;
   a water storage tank;
   a water supply pipe arranged between the water storage tank and the cultivation beds;
   distribution pipes each arranged so as to extend from the water supply pipe to the cultivation bed in each of the stages; and
   wherein the cultivation beds are arranged in two or more stages in a vertical direction,
   the rearing tank and the water storage tank each have a size and a depth capable of storing a liquid supplied to the cultivation beds in two or more stages,
   the water supply pipe is connected to a pump, and the pump enables the liquid supplied from the rearing tank to the water supply pipe to be supplied to the cultivation bed in each of the stages through each of the distribution pipes,
   each of the cultivation beds includes a bell siphon,
   the bell siphon of each of the cultivation beds has an outlet, the outlets of at least two of the bell siphons being connected to a common water discharge pipe for merging the liquid discharged from the at least two bell siphons into a merged discharge liquid stream,
   the water discharge pipe has a lower end arranged above a liquid surface in the water storage tank so that the merged discharge liquid stream is caused to fall onto the water storage tank, to thereby enable the liquid in the water storage tank to be aerated, the aquaponics system thereby forming (i) a cultivation circulating system in which the liquid circulates through the water storage tank, the pump, the water supply pipe, the distribution pipes, the cultivation beds, the bell siphons, the water discharge pipe, and the water storage tank, and (ii) a rearing circulating system in which the liquid in the water storage tank is fed to the rearing tank, and the liquid in the rearing tank is returned to the water storage tank, to thereby circulate through the rearing tank, the water storage tank, and the rearing tank,
   both or any one of the cultivation circulating system and the rearing circulating system includes both or any one of a physical filtration device and a biological filtration device,
   the liquid circulating through the cultivation circulating system is capable of cultivating a plant in the cultivation beds, and
   the liquid circulating through the rearing circulating system is capable of rearing fish and shellfish in the rearing tank.

5. An aquaponics system according to claim 4, wherein the outlets of the bell siphons of some of the cultivation beds are connected to the water discharge pipe, and the outlet of the bell siphon of one of the cultivation beds is free from being connected to the water discharge pipe and is arranged above the water storage tank, and
   the liquid is caused to fall onto the water storage tank through the water discharge pipe and the bell siphon of the one of the cultivation beds which is free from being connected to the water discharge pipe, to thereby enable the liquid in the water storage tank to be aerated.

6. An aquaponics system according to claim 4, wherein the outlets of the bell siphons of all the cultivation beds are connected to the water discharge pipe, and
   the liquid is caused to fall onto the water storage tank through the water discharge pipe, to thereby enable the liquid in the water storage tank to be aerated.

7. An aquaponics system according to claim 1, further comprising a water quality management device configured to manage water quality of the liquid in the rearing tank.

8. An aquaponics system according to claim 1, further comprising an air supply device configured to aerate the liquid in the rearing tank.

9. An aquaponics system according to claim 1, wherein the aquaponics system comprises a closed circulation type cultivation system in which the cultivation beds in at least two stages are installed indoors, and
the cultivation system includes an illuminator so that the illuminator is capable of illuminating the plant cultivated in the cultivation beds, to thereby accelerate photosynthesis.

10. An aquaponics system according to claim 1, wherein the cultivation beds in at least two stages of the cultivation system are used as a basic cultivation unit, and the basic cultivation unit is capable of being arranged to be increased in both or any one of a lateral direction and a front-back direction.

11. A fish and shellfish rearing and plant cultivation method using an aquaponics system, which is configured to rear fish and shellfish in a rearing tank, and to cultivate a plant in cultivation beds in two or more stages, the aquaponics system comprising the aquaponics system of claim 1, the method comprising rearing the fish and shellfish in the rearing tank and cultivating the plant in the cultivation beds, with the liquid circulating through the rearing and cultivation circulating system of the rearing tank, the pump, the water supply pipe, the distribution pipes, the cultivation beds, the bell siphons, the water discharge pipe, and the rearing tank in the aquaponics system.

12. A fish and shellfish rearing and plant cultivation method using an aquaponics system, which is configured to rear fish and shellfish in a rearing tank, and to cultivate a plant in cultivation beds in two or more stages, the aquaponics system comprising the aquaponics system of claim 4, the method comprising cultivating the plant in the cultivation beds with the liquid circulating through the cultivation circulating system of the water storage tank, the pump, the water supply pipe, the distribution pipes, the cultivation beds, the bell siphons, the water discharge pipe, and the water storage tank in the aquaponics system, and rearing the fish and shellfish in the rearing tank with the liquid circulating through the rearing circulating system of the rearing tank, the water storage tank, and the rearing tank.

13. A fish and shellfish rearing and plant cultivation method comprising utilizing an aquaponics system according to claim 11, wherein while the liquid in the rearing tank circulates through the rearing and cultivation circulating system in which the liquid circulates through the rearing tank, the pump, the water supply pipe, the distribution pipes, the cultivation beds, the bell siphons, the water discharge pipe, and the rearing tank, the liquid is subjected to both or any one of physical filtration and biological filtration.

14. A fish and shellfish rearing and plant cultivation method comprising utilizing an aquaponics system according to claim 11, wherein while the liquid in the rearing tank circulates through the rearing and cultivation circulating system in which the liquid circulates through the rearing tank, the pump, the water supply pipe, the distribution pipes, the cultivation beds, the bell siphons, the water discharge pipe, and the rearing tank, both or any one of water quality management of the liquid and refilling of the liquid is performed.

* * * * *